United States Patent
Suciu et al.

(10) Patent No.: US 9,869,248 B2
(45) Date of Patent: Jan. 16, 2018

(54) TWO SPOOL GAS GENERATOR TO CREATE FAMILY OF GAS TURBINE ENGINES

(71) Applicant: United Technologies Corporation, Hartford, CT (US)

(72) Inventors: Gabriel L. Suciu, Glastonbury, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 72 days.

(21) Appl. No.: 14/647,537

(22) PCT Filed: May 29, 2013

(86) PCT No.: PCT/US2013/043039
§ 371 (c)(1),
(2) Date: May 27, 2015

(87) PCT Pub. No.: WO2014/098962
PCT Pub. Date: Jun. 26, 2014

(65) Prior Publication Data
US 2015/0300250 A1    Oct. 22, 2015

Related U.S. Application Data

(60) Provisional application No. 61/738,020, filed on Dec. 17, 2012.

(51) Int. Cl.
*F02C 6/02* (2006.01)
*F02K 3/02* (2006.01)
(Continued)

(52) U.S. Cl.
CPC .............. *F02C 6/02* (2013.01); *F02C 3/10* (2013.01); *F02C 7/06* (2013.01); *F02K 3/025* (2013.01);
(Continued)

(58) Field of Classification Search
CPC ...... F02C 6/02; F02C 3/10; F02C 7/06; F02K 3/025; F02K 3/06; F05D 2220/324;
(Continued)

(56) References Cited

U.S. PATENT DOCUMENTS 2,930,190 A * 3/1960 Rogers .................... F02K 3/115
60/226.1
3,308,618 A * 3/1967 Jubb ........................ F01K 23/16
60/39.15
(Continued)

OTHER PUBLICATIONS

International Search Report from PCT/US2013/043039.
(Continued)

*Primary Examiner* — Peter Helvey
(74) *Attorney, Agent, or Firm* — Carlson, Gaskey & Olds, PC

(57) ABSTRACT

A method of configuring a plurality of gas turbine engines includes the steps of configuring each of the engines with respective ones of a plurality of propulsors. Each propulsor includes a propulsor turbine and one of a fan and a propeller. Each of the engines is configured with respective ones of a plurality of substantially mutually alike gas generators, with the respective propulsor turbine driven by products of combustion downstream of the gas generator.

9 Claims, 3 Drawing Sheets

(51) Int. Cl.
  *F02K 3/06*    (2006.01)
  *F02C 3/10*    (2006.01)
  *F02C 7/06*    (2006.01)
(52) U.S. Cl.
  CPC .......... *F02K 3/06* (2013.01); *F05D 2220/324* (2013.01); *F05D 2220/326* (2013.01); *F05D 2250/31* (2013.01); *F05D 2260/4031* (2013.01)
(58) Field of Classification Search
  CPC ........... F05D 2220/326; F05D 2250/31; F05D 2260/4031
  USPC ........................................................ 60/772
  See application file for complete search history.

(56) References Cited

U.S. PATENT DOCUMENTS

| | | | | | |
|---|---|---|---|---|---|
| 3,591,313 | A | * | 7/1971 | Wunsch | F04F 13/00 417/44.1 |
| 3,601,989 | A | * | 8/1971 | Austin | B63H 11/08 415/122.1 |
| 3,808,804 | A | * | 5/1974 | Scott-Scott | B63H 11/00 440/45 |
| 3,993,912 | A | * | 11/1976 | Ekstrom | B63H 23/24 290/17 |
| 4,123,200 | A | * | 10/1978 | Horler | F02B 33/42 417/64 |
| 4,274,811 | A | * | 6/1981 | Rao | F04F 13/00 415/217.1 |
| 4,338,525 | A | * | 7/1982 | Kilgore | B60L 11/08 290/17 |
| 4,602,478 | A | * | 7/1986 | Kelly | F01D 13/006 192/3.32 |
| 4,719,746 | A | * | 1/1988 | Keller | F02C 3/02 60/39.17 |
| 4,796,595 | A | * | 1/1989 | El-Nashar | F04F 13/00 123/559.2 |
| 5,267,432 | A | * | 12/1993 | Paxson | F04F 13/00 417/64 |
| 5,553,448 | A | * | 9/1996 | Farrell | F02C 3/10 29/401.1 |
| 6,161,374 | A | | 12/2000 | Sverdlin | |
| 8,995,620 | B2 | * | 3/2015 | Wang | H02M 7/538 378/106 |
| 2010/0327109 | A1 | | 12/2010 | Dooley et al. | |
| 2012/0034080 | A1 | | 2/2012 | Agrawal et al. | |
| 2012/0079808 | A1 | | 4/2012 | Glynn et al. | |
| 2012/0304619 | A1 | | 12/2012 | Beachy Head | |

OTHER PUBLICATIONS

International Preliminary Report on Patentability for International Application No. PCT/US2013/043039 dated Jul. 2, 2015.

* cited by examiner

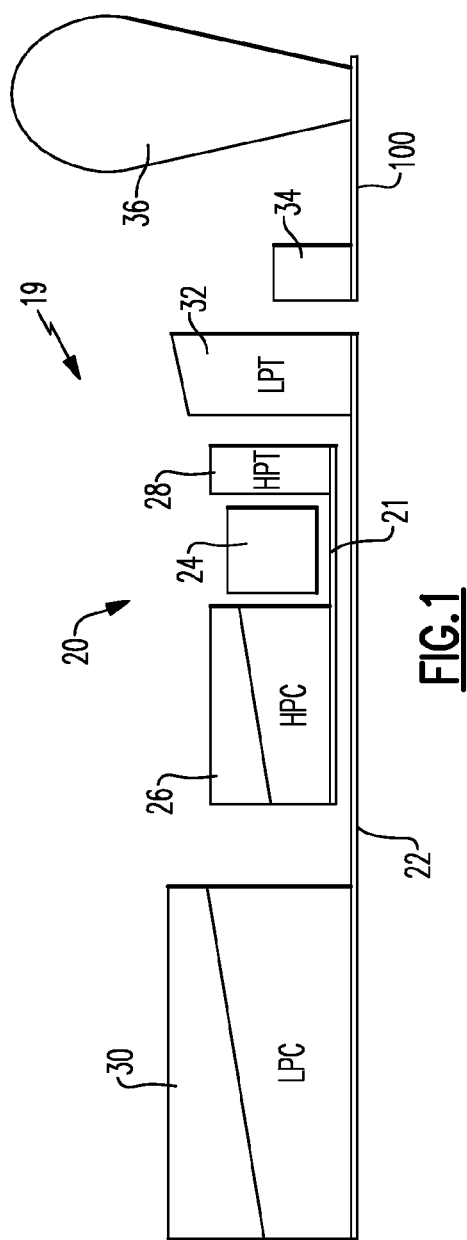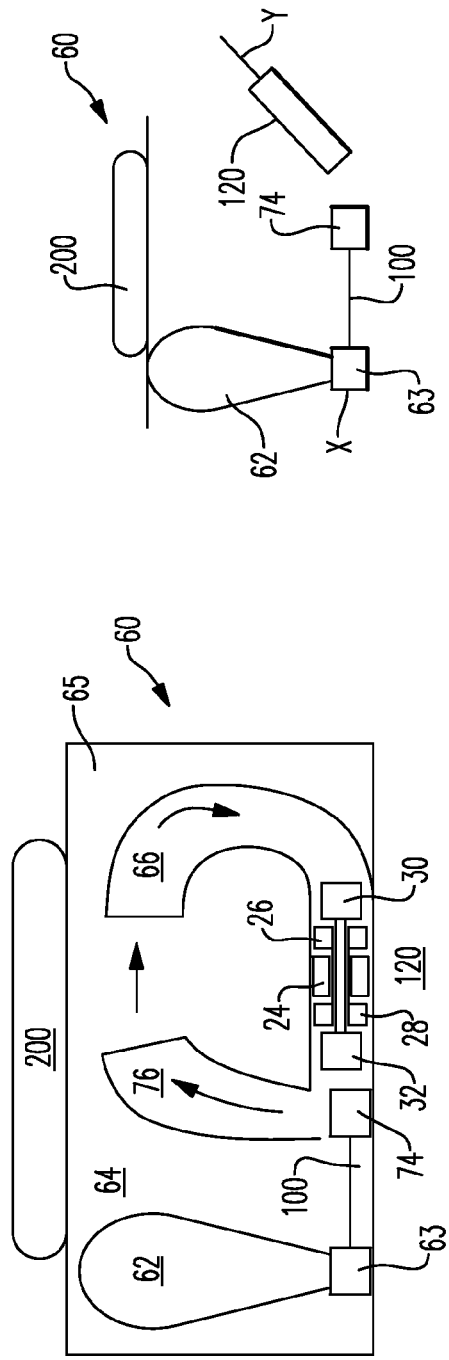

TWO SPOOL GAS GENERATOR TO CREATE FAMILY OF GAS TURBINE ENGINES

BACKGROUND

This application relates to a two spool gas generator for creating a family of gas turbine engines having different propulsor drives.

Conventional gas turbine engines typically include a fan section, a compressor section and a turbine section. There are two general known architectures. In one architecture, a low speed spool includes a low pressure turbine driving a low pressure compressor and also driving a fan. A gear reduction may be placed between the spool and the fan in some applications. There are also direct drive engines.

Another known architecture includes a third spool with a third turbine being positioned downstream of the low pressure turbine and driving the fan. The three spools have shafts connecting a turbine to the driven element, and the three shafts are mounted about each other.

All of these architectures raise challenges.

SUMMARY

In a featured embodiment, a method of configuring a plurality of gas turbine engines includes the steps of configuring each of the engines with respective ones of a plurality of propulsors. Each propulsor includes a propulsor turbine, and one of a fan and a propeller. Each of the engines is configured with respective ones of a plurality of substantially mutually alike gas generators, with the respective propulsor turbine driven by products of combustion downstream of the gas generator.

In another embodiment according to the previous embodiment, the gas generators each have a compressor section with a first and a second compressor rotor, and a turbine section with a first and second turbine rotor. The propulsor turbine is downstream of the second turbine rotor.

In another embodiment according to any of the previous embodiments, the second compressor rotor has a first overall pressure ratio, and the first compressor rotor has a second overall pressure ratio. A ratio of the first overall pressure ratio to the second overall pressure ratio is greater than or equal to about 2.0.

In another embodiment according to any of the previous embodiments, the ratio of the first overall pressure ratio to the second overall pressure ratio is greater than or equal to about 3.0.

In another embodiment according to any of the previous embodiments, the ratio of the first overall pressure ratio to the second overall pressure ratio is less than or equal to about 8.0.

In another embodiment according to any of the previous embodiments, the first turbine rotor includes a single turbine stage.

In another embodiment according to any of the previous embodiments, the second turbine rotor includes two stages.

In another embodiment according to any of the previous embodiments, the second compressor rotor includes eight stages.

In another embodiment according to any of the previous embodiments, the first compressor rotor includes six stages.

In another embodiment according to any of the previous embodiments, the ratio of the first overall pressure ratio to the second overall pressure ratio is less than or equal to about 8.0.

In another featured embodiment, a family of gas turbine engines has substantially mutually alike gas generators. A plurality of propulsor turbines are each driven by products of combustion downstream of one of the gas generators, with at least one of the plurality of propulsor turbines driving a fan and another of the plurality of propulsor turbines driving a propeller.

In another embodiment according to the previous embodiment, the gas generators each have a compressor section with a first and a second compressor rotor, and a turbine section with a first and second turbine rotor. The propulsor turbine is downstream of the second turbine rotor.

In another embodiment according to any of the previous embodiments, the second compressor rotor has a first overall pressure ratio, and the first compressor rotor has a second overall pressure ratio. A ratio of the first overall pressure ratio to the second overall pressure ratio is greater than or equal to about 2.0.

In another embodiment according to any of the previous embodiments, the high pressure turbine includes a single turbine stage.

In another embodiment according to any of the previous embodiments, the low pressure compressor rotor includes eight stages.

In another embodiment according to any of the previous embodiments, the first compressor rotor includes six stages.

In another embodiment according to any of the previous embodiments, the propulsor turbine drives a fan located at an upstream end to supply a free airstream to the second compressor rotor.

In another embodiment according to any of the previous embodiments, the fan rotates about a first axis, and the first and second compressor rotors. The first and second turbine rotors rotate about a second axis. The first and second axes are non-parallel.

In another embodiment according to any of the previous embodiments, the propulsor turbine drive a plurality of propellers.

In another featured embodiment, a gas turbine engine has a first shaft connecting a first compressor rotor to be driven by a first turbine rotor. A second shaft connects a second compressor rotor to be driven by a second turbine rotor. The second compressor rotor is upstream of the first compressor rotor, and the first turbine rotor is upstream of the second turbine rotor. The second compressor rotor has a first overall pressure ratio, and the first compressor rotor has a second overall pressure ratio. A ratio of the first overall pressure ratio to the second overall pressure ratio is greater than or equal to about 2.0. A propulsor turbine operatively connects to drive a propeller through a third shaft, with the propulsor turbine is positioned to be downstream of the first turbine rotor. A mid-turbine frame includes a bearing supporting a downstream end of the first shaft. The mid-turbine frame is positioned intermediate the second turbine rotor, and the propulsor turbine. An intermediate case includes a bearing supporting each of the first and second shafts. An inlet case is positioned upstream of the second compressor rotor, and includes a bearing that supports the first shaft, and a turbine exhaust case that receives the propulsor turbine. The inlet case further includes bearings supporting the third shaft.

These and other features may be best understood from the following drawings and specification.

BRIEF DESCRIPTION OF THE DRAWINGS

FIG. 1 schematically shows a three spool gas turbine engine.

FIG. 2A shows a second embodiment.

FIG. 2B shows a possible detail of the second embodiment.

DETAILED DESCRIPTION

Figure 3:
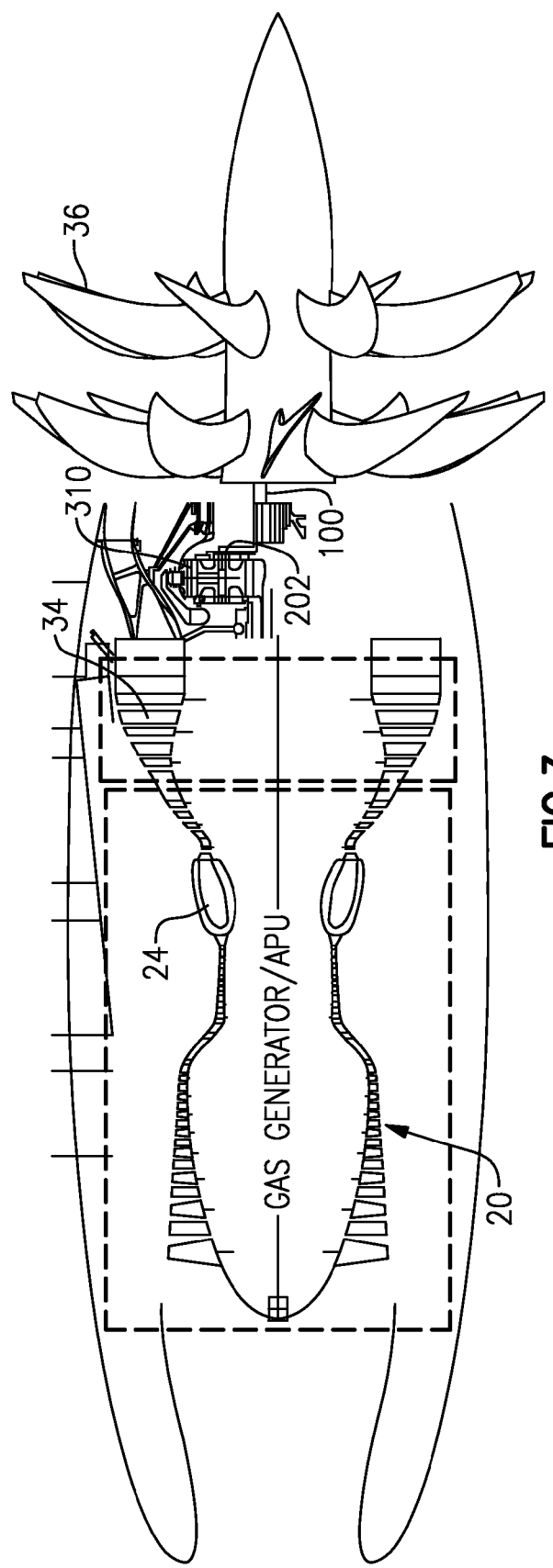
FIG. 3 shows further details of the first embodiment.

A gas turbine engine 19 is schematically illustrated in FIG. 1. A core engine, or gas generator 20, includes high speed shaft 21 is part of a high speed spool along with a high pressure turbine rotor 28 and a high pressure compressor rotor 26. A combustion section 24 is positioned intermediate the high pressure compressor rotor 26 and the high pressure turbine rotor 28. A shaft 22 of a low pressure spool connects a low pressure compressor rotor 30 to a low pressure turbine rotor 32.

Engine 19 also includes a free turbine 34 is shown positioned downstream of the low pressure turbine rotor 32 and serves to drive a propeller 36.

Various embodiments are within the scope of the disclosed engine. These include embodiments in which:

a good deal more work is done by the low pressure compressor rotor 30 than by the high pressure compressor rotor 26;

the combination of the low pressure compressor rotor 30 and high pressure compressor rotor 26 provides an overall pressure ratio equal to or above about 30;

the low pressure compressor rotor 30 includes eight stages and has a pressure ratio at cruise conditions of 14.5;

the high pressure compressor rotor 26 had six stages and an overall pressure ratio of 3.6 at cruise;

a ratio of the low pressure compressor pressure ratio to the high pressure compressor ratio is greater than or equal to about 2.0, and less than or equal to about 8.0;

more narrowly, the ratio of the two pressure ratios is between or equal to about 3.0 and less than or equal to about 8;

even more narrowly, the ratio of the two pressure ratios is greater than about 3.5.

In the above embodiments, the high pressure compressor rotor 26 will rotate at slower speeds than in the prior art. If the pressure ratio through the fan and low pressure compressor are not modified, this could result in a somewhat reduced overall pressure ratio. The mechanical requirements for the high pressure spool, in any event, are relaxed.

With the lower compressor, the high pressure turbine rotor 28 may include a single stage. In addition, the low pressure turbine rotor 32 may include two stages.

By moving more of the work to the low pressure compressor rotor 30, there is less work being done at the high pressure compressor rotor 26. In addition, the temperature at the exit of the high pressure compressor rotor 26 may be higher than is the case in the prior art, without undue challenges in maintaining the operation.

Variable vanes are less necessary for the high pressure compressor rotor 26 since it is doing less work. Moreover, the overall core size of the combined compressor rotors 30 and 26 is reduced compared to the prior art.

The engine 60 as shown in FIG. 2 includes a two spool core engine 120 including a low pressure compressor rotor 30, a low pressure turbine rotor 32, a high pressure compressor rotor 26, and a high pressure turbine rotor 28, and a combustor 24 as in the prior embodiments. This core engine 120 is a so called "reverse flow" engine meaning that the compressor 30/26 is spaced further into the engine than is the turbine 28/32. Air downstream of the fan rotor 62 passes into a bypass duct 64, and toward an exit 65. However, a core inlet duct 66 catches a portion of this air and turns it to the low pressure compressor 30. The air is compressed in the compressor rotors 30 and 26, combusted in combustor 24, and products of this combustion pass downstream over the turbine rotors 28 and 32. The products of combustion downstream of the turbine rotor 32 pass over a fan drive turbine 74. Then, the products of combustion exit through an exit duct 76 back into the bypass duct 64 (downstream of inlet 66 such that hot gas is not re-ingested into the core inlet 66), and toward the exit 65. A gear reduction 63 may be placed between the fan drive turbine 74 and fan 62.

The core engine 120, as utilized in the engine 60, may have characteristics similar to those described above with regard to the core engine 20.

The engines 19 and 60 are similar in that they have what may be called a propulsor turbine (34 or 74) which is axially downstream of the low pressure turbine rotor 32. Further, the high pressure spool radially surrounds the low pressure spool, but neither of the spools surround the propulsor turbine, nor the shaft 100 connecting the propulsor turbine to the propellers 36 or fan 62. In this sense, the propulsor rotor is separate from the gas generator portion of the engine.

The disclosed engine architecture creates a smaller core engine and yields higher overall pressure ratios and, therefore, better fuel consumption. Further, uncoupling the low pressure turbine 32 from driving a fan 62 or prop 36 enables it to run at a lower compressor surge margin, which also increases efficiency. Moreover, shaft diameters can be decreased and, in particular, for the diameter of the low pressure shafts as it is no longer necessary to drive the fan 62 or prop 36 through that shaft.

In the prior art, the ratio of the low pressure compressor pressure ratio to the high pressure compressor ratio was generally closer to 0.1 to 0.5. Known three spool engines have a ratio of the low pressure compressor pressure ratio to the high pressure compressor ratio of between 0.9 and 3.0.

A disclosed method, and a family of gas turbine engines, utilize the common gas generator or two spool core including the low pressure turbine 32, high pressure turbine 28, combustor 24, high pressure compressor 26, and low pressure compressor 30. Once these components have been designed, they can be utilized to create any number of gas turbine engines having a distinct free or propulsor turbine driving a propulsor that may be a fan or a propeller. The present invention, thus, allows a dramatic reduction in the design, development, test and manufacturing cost for creating a family of gas turbine engines having different propulsor arrangements.

As shown in FIG. 2B, the reverse core gas generator may rotate about an axis Y, while the fan 62 may rotate about an axis X which is non-parallel to axis Y. This allows the overall length of the engine 60 to be reduced. As shown schematically in FIG. 2B, an aircraft wing 200 may mount the engine 60.

FIG. 3 shows further features of the gas generator 20 which includes the propulsor turbine 34 driving a gear reduction 310 that in turn drives the shaft 100 to drive propellers 36.

Figure 4:
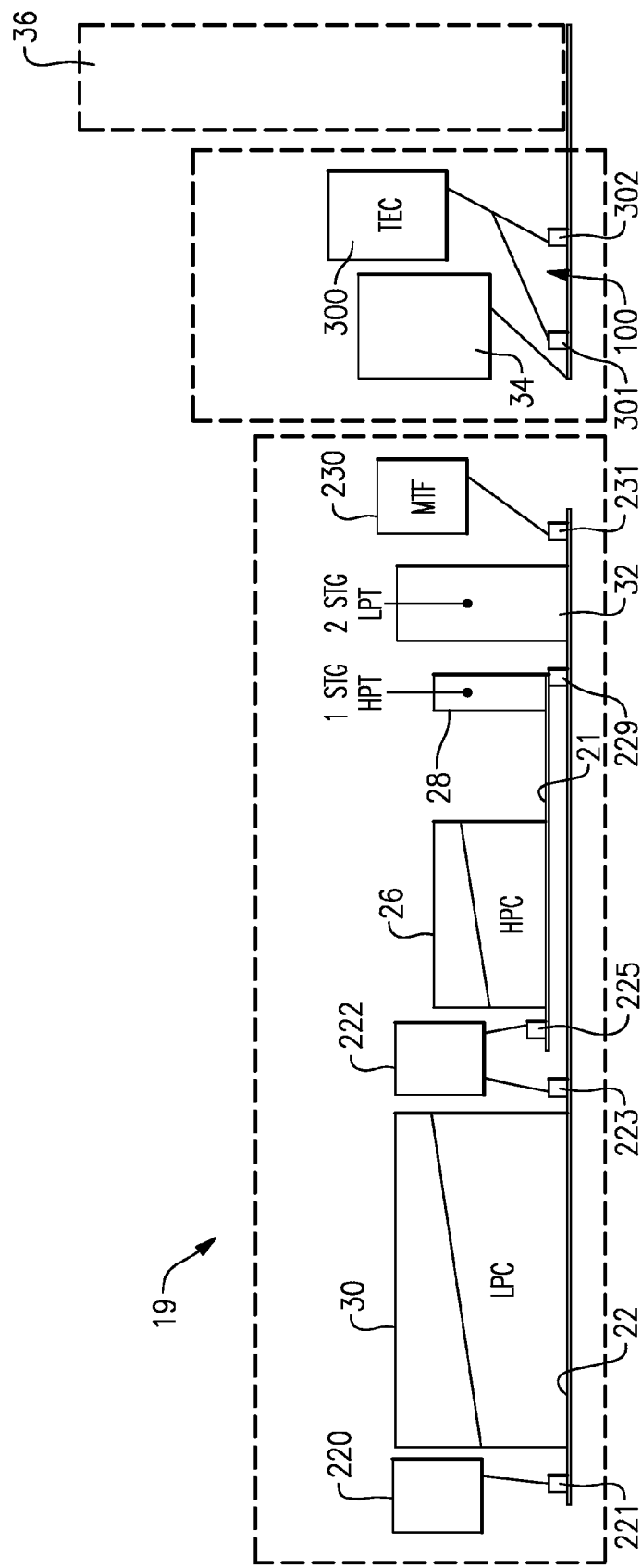
FIG. 4 shows further details of the first embodiment.

FIG. 4 shows further details of the engine 19. An inlet case 220 may include a bearing 221 supporting the shaft 22 at a forward end. An intermediate case 222 may include a bearing 223 supporting the shaft 22, and another bearing 225 supporting the shaft 21. A free intershaft bearing 229 may support both shafts 21 and 22. A mid-turbine frame 230 may be positioned downstream of the lower pressure turbine 32, and include a bearing 231 providing an end mount for the shaft 22.

A turbine exhaust case 300 may mount the propulsor turbine 34. The turbine exhaust case may include a plurality of bearings 301 and 302 supporting the shaft 100.

Because the propulsor turbine 34, and propeller 36 are configured as one unit, they can stay mounted to the aircraft while the gas generator 20 is removed. Due to the pressure ratio split of the gas generator 20, the high spool is very small and lightweight, enabling the use of the intershaft bearing 229 between the high and low spool at an aft end of the gas generator 20. Because an inner shaft bearing 231 is utilized, the mid-turbine frame 230 may be moved aft of the low pressure turbine 32, into a cooler environment, which in turn improves cost and life. The front of the low pressure compressor 30 includes bearing 221, supported by the inlet case 220, so that the low pressure compressor 30 is straddle mounted. Straddle mounting of the low pressure compressor 30 improves control over blade shift clearances and further improves engine efficiency.

Once the two spool core engine or gas generator 20/120 has been designed, it can be utilized generally identically to create a family of gas turbine engines having distinct free or propulsor turbines driving distinct propulsors. Although two embodiments of the family of gas turbine engines can be provided are disclosed, a worker of ordinary skill in the art would recognize any number of other arrangements that could be provided given the power of this method.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A family of gas turbine engines comprising:
   substantially mutually alike gas generators;
   a plurality of propulsor turbines each driven by products of combustion downstream of one of the gas generators, with at least one of the plurality of propulsor turbines driving a fan and another of the plurality of propulsor turbines driving a propeller;
   wherein said gas generators each have a compressor section with a first and a second compressor rotor, and a turbine section with a first and second turbine rotor, and the propulsor turbine is downstream of the second turbine rotor; and
   wherein said second compressor rotor having a first overall pressure ratio, and said first compressor rotor having a second overall pressure ratio, with a ratio of said first overall pressure ratio to said second overall pressure ratio being greater than or equal to about 2.0.

2. The family of gas turbine engines as set forth in claim 1, wherein said high pressure turbine includes a single turbine stage.

3. The family of gas turbine engines as set forth in claim 2, wherein said low pressure compressor rotor includes eight stages.

4. The family of gas turbine engines as set forth in claim 3, wherein said first compressor rotor includes six stages.

5. The family of gas turbine engines as set forth in claim 1, wherein said propulsor turbine driving a fan located at an upstream end to supply a free airstream to said second compressor rotor.

6. The family of gas turbine engines as set forth in claim 5, wherein said fan rotating about a first axis, and said first and second compressor rotors, and said first and second turbine rotors rotating about a second axis, and said first and second axes being non-parallel.

7. The family of gas turbine engines as set forth in claim 1, wherein said propulsor turbine driving a plurality of propellers.

8. A gas turbine engine comprising:
   a first shaft connecting a first compressor rotor to be driven by a first turbine rotor;
   a second shaft connecting a second compressor rotor to be driven by a second turbine rotor, with said second compressor rotor being upstream of the first compressor rotor, and said first turbine rotor being upstream of said second turbine rotor, said second compressor rotor having a first overall pressure ratio, and said first compressor rotor having a second overall pressure ratio, with a ratio of said first overall pressure ratio to said second overall pressure ratio being greater than or equal to about 2.0;
   a propulsor turbine operatively connected to drive a propeller through a third shaft, with said propulsor turbine being positioned to be downstream of said first turbine rotor; and
   a mid-turbine frame including a bearing supporting a downstream end of said first shaft, said mid-turbine frame being positioned intermediate said second turbine rotor, and said propulsor turbine, with an intermediate case including a bearing supporting each of said first and second shafts, and an inlet case being positioned upstream of said second compressor rotor, and including a bearing supporting said first shaft, and a turbine exhaust case receiving said propulsor turbine, and further including bearings supporting said third shaft.

9. The family of gas turbine engines as set forth in claim 1, wherein when said propulsor turbine drives said fan, said gas generator is a reverse flow gas generator with said compressor section spaced further into the engine than is said turbine section, and with said propulsor turbine further outward of said turbine section such that air heading to said compressor section initially passes past said propulsor turbine, said turbine section, and then is delivered into said compressor section.

* * * * *